United States Patent
Ahmed et al.

(10) Patent No.: US 8,150,865 B2
(45) Date of Patent: Apr. 3, 2012

(54) TECHNIQUES FOR COALESCING SUBQUERIES

(75) Inventors: Rafi Ahmed, Fremont, CA (US); Srikanth Bellamkonda, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 450 days.

(21) Appl. No.: 12/182,002

(22) Filed: Jul. 29, 2008

(65) Prior Publication Data

US 2010/0030756 A1    Feb. 4, 2010

(51) Int. Cl.
*G06F 17/30* (2006.01)

(52) U.S. Cl. ........ 707/759; 707/713; 707/716; 707/719; 707/760

(58) Field of Classification Search .......... 707/713, 707/716, 719, 720, 759–760
See application file for complete search history.

(56) References Cited

U.S. PATENT DOCUMENTS

| | | | | |
|---|---|---|---|---|
| 5,732,258 A * | 3/1998 | Jakobsson et al. | | 1/1 |
| 5,905,982 A * | 5/1999 | Carey et al. | | 707/694 |
| 6,529,896 B1 * | 3/2003 | Leung et al. | | 1/1 |
| 6,694,328 B1 * | 2/2004 | Bennett | | 1/1 |
| 7,167,852 B1 * | 1/2007 | Ahmed et al. | | 707/714 |
| 7,181,446 B2 * | 2/2007 | Bossman et al. | | 707/714 |
| 7,542,962 B2 * | 6/2009 | Finlay et al. | | 1/1 |
| 7,680,787 B2 * | 3/2010 | Di Giulio | | 707/999.005 |
| 7,930,313 B1 * | 4/2011 | Geva | | 707/766 |
| 8,019,750 B2 * | 9/2011 | Kosciusko et al. | | 707/718 |
| 2005/0165751 A1 * | 7/2005 | Bossman et al. | | 707/3 |
| 2007/0038618 A1 * | 2/2007 | Kosciusko et al. | | 707/4 |
| 2007/0073657 A1 * | 3/2007 | Santosuosso | | 707/3 |

OTHER PUBLICATIONS

Cao et al. SQL Query Optimization through Nested Relational Algebra, ACM Transactions on Database Systems, vol. 32, No. 3, Article 18, Pulication Date: Aug. 2007.*
Badia et al., Adding Subqueries to MySQL, or What Does it Take to Have a Decision-Support Engine?, ACM, Nov. 8, 2002, pp. 49-56.*
Pirahesh et al., Extensible/Rule Based Query Rewrite Optimization in Starburst, ACM, Jun. 1992, pp. 39-48.*

* cited by examiner

*Primary Examiner* — Frantz Coby
(74) *Attorney, Agent, or Firm* — Hickman Palermo Truong & Becker LLP

(57) ABSTRACT

Methods for transforming queries that contain EXISTS and NOT EXISTS subqueries are provided. The methods provided transform original queries that contain EXISTS and/or NOT EXISTS subqueries in conjunctive or disjunctive combinations into transformed queries that coalesce the original EXISTS and/or NOT EXISTS subqueries into a reduced number of EXISTS and/or NOT EXISTS subqueries, thereby eliminating duplicative table accesses and join operations.

32 Claims, 1 Drawing Sheet

TECHNIQUES FOR COALESCING SUBQUERIES

FIELD OF THE INVENTION

The present invention relates to database systems and, in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query that is submitted to a database server is analyzed by a query optimizer. Based on the analysis, the query optimizer generates an execution plan optimized for efficient execution. The optimized execution plan may be based on a rewrite of the query.

Many complex queries contain multiple subqueries that access the same tables and have the same join conditions. These subqueries are usually evaluated individually. However, the evaluation of these kinds of subqueries on an individual basis is inefficient because doing so results in redundant access of the same tables and redundant performance of the same join evaluations.

Therefore, it is desirable to develop techniques for rewriting queries with multiple subqueries to coalesce the multiple subqueries into a single subquery, thereby eliminating redundant table accesses and join evaluations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
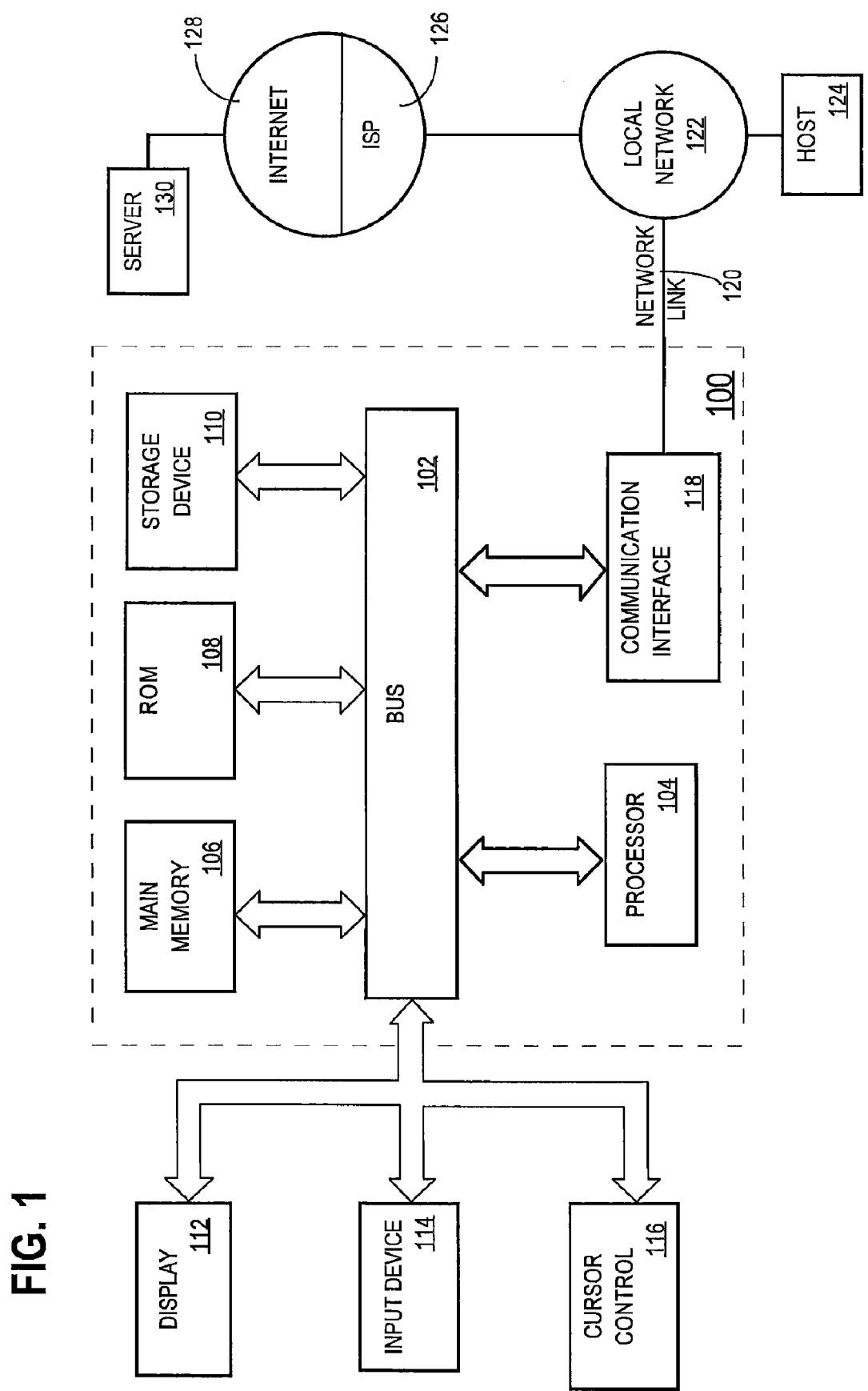
FIG. 1 depicts a computer system that may be used to implement an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Subquery Coalescing

Techniques for coalescing subqueries, or subquery coalescing, are described herein. Subquery coalescing is a technique where two subqueries that refer to the same set of tables can be coalesced into a single subquery, thereby reducing multiple access to the same table and multiple evaluations of the same join conditions to a single table access and a single join condition evaluation.

Although the techniques and samples for subquery coalescing are described below as a binary operation involving only two subqueries, the binary operation may be repeated for any number of subqueries. Therefore, the techniques for subquery coalescing described herein may also be applied, iteratively, to coalesce more than two subqueries into a single subquery.

DEFINITIONS

Two queries, or subqueries, are "equivalent" if they produce the same multi-set results. A multi-set is a collection of unordered objects that may include duplicate objects. The results of an SQL query, for example, is generally a multi-set unless it has been specified that the query returns distinct and/or ordered results.

A query or subquery X "contains" another query or subquery Y, if the result of Y is a subset of the result of X. In this case, X is called the "container" query or subquery, and Y is called the "contained" query or subquery.

Coalescing Conjunctive Exists Subqueries

According to one embodiment, two conjunctive EXISTS subqueries may be coalesced into a single EXISTS subquery if either: (1) the two subqueries are "equivalent"; or (2) one of the subqueries "contains" the other subquery. Two EXISTS subqueries are conjunctive if their results are combined in a logical AND operation.

When two conjunctive EXISTS subqueries are "equivalent", then they may be coalesced into a single EXISTS subquery that is either of the two original subqueries.

When two conjunctive EXISTS subqueries satisfy the containment property (that is, if one of the subqueries "contains" the other subquery), then they may also be coalesced into a single EXISTS subquery, where the single EXISTS subquery is the original contained subquery. The single coalesced EXISTS query produces the same result as the original conjunctive EXISTS subqueries because when the contained EXISTS subquery evaluates to TRUE, the container EXISTS subquery must also evaluate to TRUE. Also, when the contained EXISTS subquery evaluates to FALSE, the container EXISTS subquery becomes redundant because the two EXISTS subqueries are in a conjunction. As a result, two conjunctive EXISTS subqueries may be coalesced by retaining the original contained EXISTS subquery and by removing the container EXISTS subquery.

Consider the following query Q1.

```
Q1 = SELECT T1.a
     FROM tableA T1
     WHERE T2.b > 50 AND
         EXISTS (SELECT 1
                 FROM tableB T2, tableC T3
                 WHERE T2.a = T3.c and
                     T2.c = T1.d)
     AND
     EXISTS (SELECT 1
             FROM tableB T4, tableC T5
             WHERE T4.a = T5.c and
                 T4.c = T1.d and
                 T5.e > 555);
```

Query Q1 contains two conjunctive EXISTS subqueries where the first EXISTS subquery contains the second EXISTS subquery. Therefore Q1 can be rewritten so that the two original EXISTS subqueries are coalesced into a single EXISTS subquery. Query Q2 below produces the same results as Q1 and illustrates the query coalescing just discussed.

```
Q2 = SELECT T1.a
     FROM tableA T1
     WHERE T2.b > 50 and
         EXISTS (SELECT 1
                 FROM tableB T2, tableC T3
                 WHERE T2.a = T3.c and
                     T2.c = T1.d and
                     T3.e > 555);
```

Coalescing Disjunctive Exists Subqueries

According to one embodiment, two disjunctive EXISTS subqueries may be coalesced into a single EXISTS subquery if: (1) the two subqueries are "equivalent"; or (2) the subqueries are equivalent except for their correlation and/or filter predicates. Two EXISTS subqueries are disjunctive if their results are combined in a logical OR operation.

When two disjunctive EXISTS subqueries are "equivalent", then they may be coalesced into a single EXISTS subquery that is either of the two original subqueries.

When two disjunctive EXISTS subqueries satisfy the containment property (that is, if one of the subqueries "contains" the other subquery), then they may also be coalesced into a single EXISTS subquery, where the single EXISTS subquery is the original container subquery. The single coalesced EXISTS query produces the same result as the original conjunctive EXISTS subqueries because when the contained EXISTS subquery evaluates to TRUE, the container EXISTS subquery also evaluates to TRUE. Also, when the container EXISTS subquery evaluates to TRUE, the result of the contained EXISTS subquery is irrelevant to the disjunction. As a result, two disjunctive EXISTS subqueries may be coalesced by retaining the original container EXISTS subquery and by removing the contained EXISTS subquery.

When the two disjunctive EXISTS subqueries are not equivalent and do not satisfy the containment property, they may be coalesced into a single EXISTS subquery if they are equivalent except for their correlation and/or filter predicates. In this case, the filter and/or correlation predicates that make the two subqueries non-equivalent are first combined in a logical OR operation, and then added as a conjunct to one of the subqueries. In addition, the other subquery is removed. Query Q3 below is an example of a query that contains two disjunctive EXISTS subqueries that are equivalent except for their correlation and/or filter predicates.

```
Q3 = SELECT T1.a
     FROM tableA T1
     WHERE T2.b > 60 AND
         (
         EXISTS (SELECT 2
                 FROM tableB T2, tableC T3
                 WHERE T2.a = T3.c and
                     T2.d = T1.b and
                     T3.a = 5)
         OR
```

```
         EXISTS (SELECT 4
                 FROM tableB T4, tableC T5
                 WHERE T4.a = T5.c and
                     T4.c = T1.e and
                     T4.f > 9)
         );
```

The two disjunctive EXISTS subqueries in Q3 may be coalesced into a single EXSTS subquery, as illustrated by query Q4 below.

```
Q4 = SELECT T1.a
     FROM tableA T1
     WHERE T2.b > 60 AND
         EXISTS (SELECT 2
                 FROM tableB T2, tableC T3
                 WHERE T2.a = T3.c AND
                     ((T2.d = T1.b and
                     T3.a = 5) OR
                     (T2.c = T1.e and
                     T2.f > 9)));
```

Coalescing Disjunctive Not Exists Subqueries

According to one embodiment, two disjunctive NOT EXISTS subqueries may be coalesced into a single NOT EXISTS subquery if: (1) the two subqueries are "equivalent"; or (2) one of the subqueries "contains" the other subquery. Two NOT EXISTS subqueries are disjunctive if their results are combined in a logical OR operation.

When two disjunctive NOT EXISTS subqueries are "equivalent", then they may be coalesced into a single NOT EXISTS subquery that is either of the two original subqueries.

When two disjunctive NOT EXISTS subqueries satisfy the containment property (that is, if one of the subqueries "contains" the other subquery), then they may also be coalesced into a single NOT EXISTS subquery, where the single NOT EXISTS subquery is the original contained subquery. The single coalesced NOT EXISTS query produces the same result as the original conjunctive NOT EXISTS subqueries because when the contained NOT EXISTS subquery evaluates to FALSE, the container NOT EXISTS subquery also evaluates to FALSE. Also, when the contained NOT EXISTS subquery evaluates to TRUE, the result of the container NOT EXISTS subquery is irrelevant to the disjunction. As a result, two disjunctive NOT EXISTS subqueries may be coalesced by retaining the original contained NOT EXISTS subquery and by removing the container NOT EXISTS subquery.

Consider the following query Q5.

```
Q5 = SELECT T1.a
     FROM tableA T1
     WHERE T2.b > 60 AND
         (
         NOT EXISTS (SELECT 1
                 FROM tableB T2, tableC T3
                 WHERE T2.a = T3.c and
                     T2.c = T1.d)
         OR
         NOT EXISTS (SELECT 2
                 FROM tableB T2, tableC T5
```

```
            WHERE T2.a = T5.c and
                  T2.c = T1.d and
                  T2.e > 2)
    );
```

Query Q1 contains two disjunctive NOT EXISTS subqueries where the first NOT EXISTS subquery contains the second NOT EXISTS subquery. Therefore Q5 can be rewritten so that the two original NOT EXISTS subqueries are coalesced into a single NOT EXISTS subquery. Query Q6 below produces the same results as Q5 and illustrates the query coalescing just discussed.

```
Q6 = SELECT T1.a
     FROM tableA T1
     WHERE T2.b > 60 and
           NOT EXISTS (SELECT 1
                       FROM tableB T2, tableC T3
                       WHERE T2.a = T3.c and
                             T2.c = T1.d and
                             T3.e > 2);
```

Coalescing Conjunctive Not Exists Subqueries

According to one embodiment, two conjunctive NOT EXISTS subqueries may be coalesced into a single NOT EXISTS subquery if: (1) the two subqueries are "equivalent"; or (2) the subqueries are equivalent except for their correlation and/or filter predicates. Two NOT EXISTS subqueries are conjunctive if their results are combined in a logical AND operation.

When two conjunctive NOT EXISTS subqueries are "equivalent", then they may be coalesced into a single NOT EXISTS subquery that is either of the two original subqueries.

When two conjunctive NOT EXISTS subqueries satisfy the containment property (that is, if one of the subqueries "contains" the other subquery), then they may also be coalesced into a single NOT EXISTS subquery, where the single NOT EXISTS subquery is the original container subquery. The single coalesced NOT EXISTS query produces the same result as the original conjunctive NOT EXISTS subqueries because when the contained NOT EXISTS subquery evaluates to FALSE, the container NOT EXISTS subquery also evaluates to FALSE. Also, when the contained NOT EXISTS subquery evaluates to TRUE, the result of the contained NOT EXISTS subquery is irrelevant to the conjunction. As a result, two conjunctive NOT EXISTS subqueries may be coalesced by retaining the original container NOT EXISTS subquery and by removing the contained NOT EXISTS subquery.

When the two conjunctive NOT EXISTS subqueries are not equivalent and do not satisfy the containment property, they may be coalesced into a single NOT EXISTS subquery if they are equivalent except for their correlation and/or filter predicates. In this case, the filter and/or correlation predicates that make the two subqueries non-equivalent are first combined in a logical OR operation, and then added as a conjunct to one of the subqueries. In addition, the other subquery is removed. Query Q7 below is an example of a query that contains two disjunctive NOT EXISTS subqueries that are equivalent except for their correlation and/or filter predicates.

```
Q7 = SELECT T1.a
     FROM tableA T1
     WHERE T1.b > 60 AND
           (
           NOT EXISTS (SELECT 1
                       FROM tableB T2, tableC T3
                       WHERE T2.c = T3.a and
                             T3.b > 55 and
                             T2.a = T1.d)
           AND
           NOT EXISTS (SELECT 4
                       FROM tableB T4, tableC T5
                       WHERE T4.c = T5.a and
                             T4.e = 33 and
                             T4.a = T1.d)
           );
```

The two conjunctive NOT EXISTS subqueries in Q7 may be coalesced into a single NOT EXSTS subquery, as illustrated by query Q8 below.

```
Q8 = SELECT T1.a
     FROM tableA T1
     WHERE T2.b > 60 AND
           NOT EXISTS (SELECT 1
                       FROM tableB T2, tableC T3
                       WHERE T2.c = T3.a and
                             T2.a = T1.d and
                             (T3.b > 55 OR
                              T2.e = 33));
```

Coalescing Conjunctive Exists and Not Exists Subqueries

According to one embodiment, a conjunctive EXISTS subquery and NOT EXISTS subquery may be coalesced into a single subquery if either: (1) the two subqueries are equivalent except for the subquery types (that is, one of the subqueries is an EXISTS subquery and the other of the subqueries is a NOT EXISTS subquery); or (2) the two subqueries are equivalent except for the subquery types and filter predicates that are in only one of the two subqueries. An EXISTS subquery and a NOT EXISTS subquery are conjunctive if their results are combined in a logical AND operation.

When the conjunctive EXISTS subquery and the NOT EXISTS subquery are "equivalent", this is a case where the conjunction is always FALSE. Therefore, the two subqueries may be coalesced into a single FALSE predicate, such as "0=1".

When the NOT EXISTS subqueries contains one or more filter predicates that are not in the EXISTS subquery, the two subqueries may be coalesced into a single EXISTS subquery that includes a HAVING clause that contains the one or more filter predicates and that simulates the behavior of the NOT EXISTS subquery. For example, consider Query Q9.

```
Q9 = SELECT T1.x
     FROM T1, T2
     WHERE T1.y = T2.y and T2.z > 3 AND
     EXISTS (SELECT 1
             FROM T3, T4
             WHERE T3.x = T4.x and
                   T3.b = T1.b and
                   T4.q = 8) AND
     NOT EXISTS (SELECT 1
```

```
            FROM T3, T4
            WHERE T3.x = T4.x and
                  T3.b = T1.b and
                  T4.q = 8 and
                  T3.h > 7);
```

Query Q9 contains an EXISTS subquery and a NOT EXISTS subquery that are equivalent except for the query types and the additional predicate of "T3.h>7" in the NOT EXISTS subquery. Therefore Q9 can be rewritten so that the two original subqueries are coalesced into a single EXISTS subquery that contains a HAVING clause. Query Q10 below produces the same results as Q9 and illustrates this type of coalescing.

```
Q10 = SELECT T1.x
      FROM T1, T2
      WHERE T1.y = T2.y and T2.z > 3 AND
      EXISTS (SELECT 1
              FROM T3, T4
              WHERE T3.x = T4.x and
                    T3.b = T1.b and
                    T4.q = 8
              HAVING SUM(case when T3.h > 7
                         THEN 1 ELSE 0 end) = 0);
```

When the EXISTS subquery contains one or more filter predicates that are not in the NOT EXISTS subquery, the two subqueries may be coalesced into a single FALSE predicate. This replacement of the two subqueries with a single FALSE predicate would produce the same results as the two subqueries because when the EXISTS subquery produces at least one row and evaluates to TRUE, the NOT EXISTS subquery would also produce at least one row and evaluate to FALSE. Also, when the NOT EXISTS subquery produces no rows and evaluates to TRUE, the EXISTS subquery would also produce no rows and evaluates to FALSE. Therefore, the conjunction of the EXISTS subquery and the NOT EXISTS subquery will always be FALSE.

Consider Query Q11 below.

```
Q11 = SELECT T1.x
      FROM T1, T2
      WHERE T1.y = T2.y and T2.z > 3 AND
      EXISTS (SELECT 1
              FROM T3, T4
              WHERE T3.x = T4.x and
                    T3.b = T1.b and
                    T4.q = 8 and
                    T4.g > 11) AND
      NOT EXISTS (SELECT 1
                  FROM T3, T4
                  WHERE T3.x = T4.x and
                        T3.b = T1.b and
                        T4.q = 8);
```

Query Q11 contains an EXISTS subquery and a NOT EXISTS subquery that are equivalent except for the query types and the additional predicate of "T4.g>11" in the EXISTS subquery. Therefore Q11 can be rewritten so that the two original subqueries are coalesced into a single false predicate. Query Q12 below illustrates this and produces the same results as Q11.

```
Q12 = SELECT T1.x
      FROM T1, T2
      WHERE T1.y = T2.y and T2.z > 3 and (1 = 0);
```

Coalescing Disjunctive Exists and Not Exists Subqueries

According to one embodiment, a disjunctive EXISTS subquery and NOT EXISTS subquery may be coalesced into a single subquery if either: (1) the two subqueries are equivalent except for the subquery types (that is, one of the subqueries is an EXISTS subquery and the other of the subqueries is a NOT EXISTS subquery); or (2) the two subqueries are equivalent except for the subquery types and filter predicates that are in only one of the two subqueries. An EXISTS subquery and a NOT EXISTS subquery are disjunctive if their results are combined in a logical OR operation.

When the disjunctive EXISTS subquery and the NOT EXISTS subquery are "equivalent", this is a trivial case where the conjunction is always TRUE. Therefore, the two subqueries may be completely removed.

When the EXISTS subqueries contains one or more filter predicates that are not in the NOT EXISTS subquery, the two subqueries may be coalesced into a single NOT EXISTS subquery that includes a HAVING clause that contains the one or more filter predicates and that simulates the behavior of the EXISTS subquery. For example, consider Query Q13.

```
Q13 = SELECT T1.x
      FROM T1, T2
      WHERE T1.y = T2.y and T2.z > 3 AND
      EXISTS (SELECT 1
              FROM T3, T4
              WHERE T3.x = T4.x and
                    T3.b = T1.b and
                    T4.q = 8 and
                    T3.h > 7) OR
      NOT EXISTS (SELECT 1
                  FROM T3, T4
                  WHERE T3.x = T4.x and
                        T3.b = T1.b and
                        T4.q = 8);
```

Query Q13 contains an EXISTS subquery and a NOT EXISTS subquery that are equivalent except for the query types and the additional predicate of "T3. h>7" in the EXISTS subquery. Therefore Q13 can be rewritten so that the two original subqueries are coalesced into a single NOT EXISTS subquery that contains a HAVING clause. Query Q14 below produces the same results as Q13 and illustrated this type of coalescing.

```
Q14 = SELECT T1.x
      FROM T1, T2
      WHERE T1.y = T2.y and T2.z > 3 AND
      NOT EXISTS (SELECT 1
                  FROM T3, T4
                  WHERE T3.x = T4.x and
                        T3.b = T1.b and
                        T4.q = 8
                  HAVING SUM(case when T3.h > 7
                             THEN 1 ELSE 0 end) = 0);
```

When the NOT EXISTS subquery contains one or more filter predicates that are not in the NOT EXISTS subquery, the disjunct of the two subqueries always evaluates to TRUE. As such, for this case, the two subqueries may be completely removed.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to storage media and transmission media. Storage media includes both non-volatile media and volatile media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for transforming a query, comprising:
   generating a transformed query for the query, wherein:
      the query includes a first subquery and a second subquery;
      both the first subquery and the second subquery are EXISTS subqueries; and
      generating the transformed query comprises coalescing the first subquery and the second subquery into a single subquery by eliminating either the first subquery or the second subquery and not replacing the eliminated subquery with any subquery.

2. The computer-implemented method of claim 1, wherein:
   the first subquery is equivalent to the second subquery; and
   the single subquery is either the first subquery or the second subquery.

3. The computer-implemented method of claim 1, wherein:
   the first subquery and the second subquery are conjunctive;
   the first subquery contains the second subquery; and
   the single subquery is the second subquery.

4. The computer-implemented method of claim 1, wherein:
   the first subquery and the second subquery are disjunctive;
   the first subquery contains the second subquery; and
   the single subquery is the first subquery.

5. The computer-implemented method of claim 1, wherein:
   the first subquery and the second subquery are disjunctive;
   the first subquery does not contain the second subquery;
   the second subquery does not contain the first subquery;
   the first subquery and the second subquery are equivalent except that:
      the first subquery contains at least one predicate that is not in the second subquery; and
      the second subquery contains at least one predicate that is not in the first subquery;
   the single subquery is equivalent to the first subquery except that the at least one predicate in the first subquery that is not in the second subquery is replaced with a disjunctive combination of:
      the at least one predicate in the first subquery that is not in the second subquery and the at least one predicate in the second subquery that is not in the first subquery.

6. A computer-implemented method for transforming a query, comprising:
   generating a transformed query for the query, wherein:
      the query includes a first subquery and a second subquery;
      both the first subquery and the second subquery are NOT EXISTS subqueries; and
      generating the transformed query comprises coalescing the first subquery and the second subquery into a single subquery by eliminating either the first subquery or the second subquery and not replacing the eliminated subquery with any subquery.

7. The computer-implemented method of claim 6, wherein:
   the first subquery is equivalent to the second subquery; and
   the single subquery is either the first subquery or the second subquery.

8. The computer-implemented method of claim 6, wherein:
   the first subquery and the second subquery are disjunctive;
   the first subquery contains the second subquery; and
   the single subquery is the second subquery.

9. The computer-implemented method of claim 6, wherein:
   the first subquery and the second subquery are conjunctive;
   the first subquery contains the second subquery; and
   the single subquery is the first subquery.

10. The computer-implemented method of claim 6, wherein:
   the first subquery and the second subquery are conjunctive;
   the first subquery does not contain the second subquery;
   the second subquery does not contain the first subquery;
   the first subquery and the second subquery are equivalent except that:
      the first subquery contains at least one predicate that is not in the second subquery; and
      the second subquery contains at least one predicate that is not in the first subquery;
   the single subquery is equivalent to the first subquery except that the at least one predicate in the first subquery that is not in the second subquery is replaced with a disjunctive combination of:
      the at least one predicate in the first subquery that is not in the second subquery and the at least one predicate in the second subquery that is not in the first subquery.

11. A computer-implemented method for transforming a query, comprising:
   generating a transformed query for the query, wherein:
      the query includes a first subquery and a second subquery;
      the first subquery is an NOT EXISTS subquery;
      the second subquery is an EXISTS subquery;
      one of the first subquery and second subquery contains at least one predicate that is not in the other of the first subquery and second subquery; and
      generating the transformed query comprises coalescing the first subquery and the second subquery into a single subquery by eliminating either the first subquery or the second subquery and not replacing the eliminated subquery with any subquery.

12. A computer-implemented method for transforming a query, comprising:
   generating a transformed query for the query, wherein:
      the query includes a first subquery and a second subquery;
      the first subquery is an NOT EXISTS subquery;
      the second subquery is an EXISTS subquery; and
      the first subquery is equivalent to the second subquery except that the first subquery is a NOT EXISTS subquery and the second subquery is an EXISTS subquery;
      the first subquery and the second subquery are disjunctive; and
   generating the transformed query comprises coalescing the first subquery and the second subquery into a true predicate.

13. The computer-implemented method of claim 11, wherein:
the first subquery and the second subquery are conjunctive;
the first subquery and the second subquery are equivalent except that:
the first subquery is an NOT EXISTS subquery and the second subquery is an EXISTS subquery;
the first subquery contains at least one predicate that is not in the second subquery;
the second subquery does not contain any predicate that is not in the first subquery;
the single subquery is equivalent to the second subquery except that the single subquery additionally contains a HAVING clause that simulates the behavior of the at least one predicate in the first subquery that is not in the second subquery.

14. The computer-implemented method of claim 11, wherein:
the first subquery and the second subquery are conjunctive;
the first subquery and the second subquery are equivalent except that:
the first subquery is an NOT EXISTS subquery and the second subquery is an EXISTS subquery;
the second subquery contains at least one predicate that is not in the first subquery;
the first subquery does not contain any predicate that is not in the second subquery;
the single subquery is a false predicate.

15. The computer-implemented method of claim 11, wherein:
the first subquery and the second subquery are disjunctive;
the first subquery and the second subquery are equivalent except that:
the first subquery is an NOT EXISTS subquery and the second subquery is an EXISTS subquery;
the second subquery contains at least one predicate that is not in the first subquery;
the first subquery does not contain any predicate that is not in the second subquery;
the single subquery is equivalent to the first subquery except that the single subquery additionally contains a HAVING clause that simulates the behavior of the at least one predicate in the second subquery that is not in the first subquery.

16. The computer-implemented method of claim 11, wherein:
the first subquery and the second subquery are disjunctive;
the first subquery and the second subquery are equivalent except that:
the first subquery is an NOT EXISTS subquery and the second subquery is an EXISTS subquery;
the first subquery contains at least one predicate that is not in the second subquery;
the second subquery does not contain any predicate that is not in the first subquery;
generating the transformed subquery comprises removing both the first subquery and the second subquery without creating the single subquery.

17. A computer-readable storage medium storing instructions for transforming a query, wherein the instructions include instructions which, when executed by one or more processors, cause the one or more processors to perform steps of:
generating a transformed query for the query, wherein:
the query includes a first subquery and a second subquery;
both the first subquery and the second subquery are EXISTS subqueries; and
generating the transformed query comprises coalescing the first subquery and the second subquery into a single subquery by eliminating either the first subquery or the second subquery and not replacing the eliminated subquery with any subquery.

18. The computer-readable medium of claim 17, wherein:
the first subquery is equivalent to the second subquery; and
the single subquery is either the first subquery or the second subquery.

19. The computer-readable medium of claim 17, wherein:
the first subquery and the second subquery are conjunctive;
the first subquery contains the second subquery; and
the single subquery is the second subquery.

20. The computer-readable medium of claim 17, wherein:
the first subquery and the second subquery are disjunctive;
the first subquery contains the second subquery; and
the single subquery is the first subquery.

21. The computer-readable medium of claim 17, wherein:
the first subquery and the second subquery are disjunctive;
the first subquery does not contain the second subquery;
the second subquery does not contain the first subquery;
the first subquery and the second subquery are equivalent except that:
the first subquery contains at least one predicate that is not in the second subquery; and
the second subquery contains at least one predicate that is not in the first subquery;
the single subquery is equivalent to the first subquery except that the at least one predicate in the first subquery that is not in the second subquery is replaced with a disjunctive combination of:
the at least one predicate in the first subquery that is not in the second subquery and the at least one predicate in the second subquery that is not in the first subquery.

22. A computer-readable storage medium storing instructions for transforming a query, wherein the instructions include instructions which, when executed by one or more processors, cause the one or more processors to perform steps of:
generating a transformed query for the query, wherein:
the query includes a first subquery and a second subquery;
both the first subquery and the second subquery are NOT EXISTS subqueries; and
generating the transformed query comprises coalescing the first subquery and the second subquery into a single subquery by eliminating either the first subquery or the second subquery and not replacing the eliminated subquery with any subquery.

23. The computer-readable medium of claim 22, wherein:
the first subquery is equivalent to the second subquery; and
the single subquery is either the first subquery or the second subquery.

24. The computer-readable medium of claim 22, wherein:
the first subquery and the second subquery are disjunctive;
the first subquery contains the second subquery; and
the single subquery is the second subquery.

25. The computer-readable medium of claim 22, wherein:
the first subquery and the second subquery are conjunctive;
the first subquery contains the second subquery; and
the single subquery is the first subquery.

26. The computer-readable medium of claim 22, wherein:
the first subquery and the second subquery are conjunctive;
the first subquery does not contain the second subquery;
the second subquery does not contain the first subquery;
the first subquery and the second subquery are equivalent except that:
the first subquery contains at least one predicate that is not in the second subquery; and
the second subquery contains at least one predicate that is not in the first subquery;
the single subquery is equivalent to the first subquery except that the at least one predicate in the first subquery that is not in the second subquery is replaced with a disjunctive combination of:
the at least one predicate in the first subquery that is not in the second subquery and the at least one predicate in the second subquery that is not in the first subquery.

27. A computer-readable storage medium storing instructions for transforming a query, wherein the instructions include instructions which, when executed by one or more processors, cause the one or more processors to perform steps of:
generating a transformed query for the query, wherein:
the query includes a first subquery and a second subquery;
the first subquery is an NOT EXISTS subquery;
the second subquery is an EXISTS subquery;
one of the first subquery and second subquery contains at least one predicate that is not in the other of the first subquery and second subquery; and
generating the transformed query comprises coalescing the first subquery and the second subquery into a single subquery by eliminating either the first subquery or the second subquery and not replacing the eliminated subquery with any subquery.

28. A computer-readable storage medium storing instructions for transforming a query, wherein the instructions include instructions which, when executed by one or more processors, cause the one or more processors to perform steps of:
generating a transformed query for the query, wherein:
the query includes a first subquery and a second subquery;
the first subquery is an NOT EXISTS subquery;
the second subquery is an EXISTS subquery; and
the first subquery is equivalent to the second subquery except that the first subquery is a NOT EXISTS subquery and the second subquery is an EXISTS subquery;
the first subquery and the second subquery are disjunctive; and
generating the transformed query comprises coalescing the first subquery and the second subquery into a true predicate.

29. The computer-implemented method of claim 27, wherein:
the first subquery and the second subquery are conjunctive;
the first subquery and the second subquery are equivalent except that:
the first subquery is an NOT EXISTS subquery and the second subquery is an EXISTS subquery;
the first subquery contains at least one predicate that is not in the second subquery;
the second subquery does not contain any predicate that is not in the first subquery;
the single subquery is equivalent to the second subquery except that the single subquery additionally contains a HAVING clause that simulates the behavior of the at least one predicate in the first subquery that is not in the second subquery.

30. The computer-readable medium of claim 27, wherein:
the first subquery and the second subquery are conjunctive;
the first subquery and the second subquery are equivalent except that:
the first subquery is an NOT EXISTS subquery and the second subquery is an EXISTS subquery;
the second subquery contains at least one predicate that is not in the first subquery;
the first subquery does not contain any predicate that is not in the second subquery;
the single subquery is a false predicate.

31. The computer-readable medium of claim 27, wherein:
the first subquery and the second subquery are disjunctive;
the first subquery and the second subquery are equivalent except that:
the first subquery is an NOT EXISTS subquery and the second subquery is an EXISTS subquery;
the second subquery contains at least one predicate that is not in the first subquery;
the first subquery does not contain any predicate that is not in the second subquery;
the single subquery is equivalent to the first subquery except that the single subquery additionally contains a HAVING clause that simulates the behavior of the at least one predicate in the second subquery that is not in the first subquery.

32. The computer-readable medium of claim 27, wherein:
the first subquery and the second subquery are disjunctive;
the first subquery and the second subquery are equivalent except that:
the first subquery is an NOT EXISTS subquery and the second subquery is an EXISTS subquery;
the first subquery contains at least one predicate that is not in the second subquery;
the second subquery does not contain any predicate that is not in the first subquery;
generating the transformed subquery comprises removing both the first subquery and the second subquery without creating the single subquery.

* * * * *

UNITED STATES PATENT AND TRADEMARK OFFICE
CERTIFICATE OF CORRECTION

PATENT NO. : 8,150,865 B2  Page 1 of 1
APPLICATION NO. : 12/182002
DATED : April 3, 2012
INVENTOR(S) : Ahmed et al.

It is certified that error appears in the above-identified patent and that said Letters Patent is hereby corrected as shown below:

On front page, in column 2, under "Other Publications", line 3, delete "Pulication" and insert -- Publication --, therefor.

In column 4, line 11, delete "EXSTS" and insert -- EXISTS --, therefor.

In column 6, line 19, delete "EXSTS" and insert -- EXISTS --, therefor.

In column 13, line 57, in Claim 16, delete "subquery" and insert -- query --, therefor.

In column 16, line 1, in Claim 29, delete "method" and insert -- medium --, therefor.

In column 16, line 32, in Claim 32, delete "subquery" and insert -- query --, therefor.

Signed and Sealed this
Eighteenth Day of September, 2012

David J. Kappos
*Director of the United States Patent and Trademark Office*